United States Patent [19]

Onda et al.

[11] Patent Number: 4,858,096
[45] Date of Patent: Aug. 15, 1989

[54] RESONANT CONVERTER FOR STABILIZED OPERATION OF SWITCHING DEVICES

[75] Inventors: Kenichi Onda; Yasuo Matsuda; Kojin Abe; Yasunori Iwafuji; Hiroyuki Aoyama, all of Hitachi; Hideo Yoshinaka, Kumagaya, all of Japan

[73] Assignees: Hitachi, Ltd.; Hitachi Metals, Ltd., Tokyo, Japan

[21] Appl. No.: 178,193

[22] Filed: Apr. 6, 1988

[30] Foreign Application Priority Data

Apr. 7, 1987 [JP] Japan .................................. 62-83760
Sep. 9, 1987 [JP] Japan ................................. 62-225654

[51] Int. Cl.$^4$ ......................................... H02M 3/335
[52] U.S. Cl. ...................................... 363/22; 363/56; 363/133
[58] Field of Search ..................... 363/22, 23, 53, 56, 363/97, 133

[56] References Cited

U.S. PATENT DOCUMENTS

| | | | |
|---|---|---|---|
| 3,818,312 | 6/1974 | Luursema et al. | 363/133 |
| 4,015,171 | 3/1977 | Miller | 363/53 |
| 4,334,267 | 6/1982 | Miko | 363/22 |
| 4,424,556 | 1/1984 | Maeda et al. | 363/22 |
| 4,466,041 | 8/1984 | Witulski et al. | 363/56 |
| 4,755,923 | 7/1988 | Maeba et al. | 363/23 |

FOREIGN PATENT DOCUMENTS 48-38429 6/1973 Japan .

OTHER PUBLICATIONS

Ninomiya et al.; "Voltage-Mode Resonant Push-Pull Converter with Magnetic Power Controllers"; PESC 87; 7/87.
Ninomiya et al., "Characteristics of Parallel Resonant Push-Pull Converter Controlled by Magnetic Amplifiers"; Japan Society of Applied Magnetism, vol. 11, No. 2, Jun. 1987.

Primary Examiner—Patrick R. Salce
Assistant Examiner—Jeffrey Sterrett
Attorney, Agent, or Firm—Antonelli, Terry & Wands

[57] ABSTRACT

An impedance for short-circuit prevention is connected with a secondary winding side of a transformer of a resonant converter comprising a resonant circuit, a D.C. input source, and a switching devices. The short-circuit prevention impedance is driven by the driving current generated in a driving winding in accordance with a resonance current at the primary winding side of the transformer, thereby obviating the stop of an oscillation. The oscillation can be stopped at a timing of not generating a surge voltage in the switching devices by detecting a current returning to the D.C. input power source.

20 Claims, 13 Drawing Sheets

RESONANT CONVERTER FOR STABILIZED OPERATION OF SWITCHING DEVICES

BACKGROUND OF THE INVENTION

This invention relates to a resonant converter and more particularly to a resonant converter which is suitable to assure the stabilized operation of switching devices used therein.

Self-excited oscillation of the resonant converter is disclosed in the following references: U.S. Pat. No. 3,818,312 issued on June 18, 1974, an article entitled "Voltage-Mode Resonant Push-Pull Converter with Magnetic Power Controllers" by T. Ninomiya et al in the 18th Annual IEEE Power Electronics Specialists Conference (PESC), June 23, 1987, pp. 339-347; an article entitled "Characteristics of Parallel Resonant Push-Pull Converter Controlled by Magnetic Amplifiers" by T. Ninomiya et al in the Journal of Japan Society of Applied Magnetics, vol. 11, No. 2, 1987, pp. 379-382, and an article in "Transister Technique" published by CQ Publishing Co., Ltd., 1987, No. 3 pp. 406-407, which are incorporated herein by reference.

On the other hand, a switching system is generally used for converter circuits for obtaining stabilized D.C. voltages from the commercial power supply or inverter circuits for providing a stablized D.C. source or high frequency A.C. source. However, the prior art switching system suffers from a disadvantage that when the output current of the converter is increased, the oscillation operation may be stopped. The cause of this has not been clarified. Further, the prior art switching system is difficult to miniaturize at a higher switching frequency due to the switching loss and switching noise which occur from increased superposition of the current and voltage due to leak inductance between the primary and secondary wirings when the switching devices turn on or off. On the other hand, it is desired to miniaturize a resonant power source at a high switching frequency; the resonant power source is provided with an LC resonance circuit in its main circuit to provide sinusoidal current and voltage waveforms and to decrease the superposition period of the voltage and current thereby reducing the switching loss and the switching noise harmonic component.

An example of such a resonant power source is a resonant inverter having a push-pull arrangement in its main circuit, such as disclosed in JP-A-48-8429. This resonant power source, however, the following disadvantage. In such a resonant power source, in which a resonant reactor is connected with a D.C. power source obtained from the commercial power supply, at least one of two switching devices used must be always placed in its conducting state. However, both switching devices are simultaneously turned off when the oscillation is compulsorily and urgently stopped through the remote on-off control from outside and the internal protection circuit. Then, a large voltage surge is produced due to the magnetic energy stored in the resonant reactor. This voltage surge is applied to the main switching devices which may be destroyed. Thus, the above resonant power source can not satisfactorily perform the above control and so has been applied to its limited use.

Further, the prior art resonant power source has a disadvantage that when, the voltage induced in the wirings for self-excited oscillation in the converter which is prepared to initiate the oscillation does not reach the voltage which enables the switching devices to be conductive, the oscillation can not be initiated.

SUMMARY OF THE INVENTION

An object of this invention is to provide a resonant converter which is capable of performing a stabilized oscillation operation without using an output current.

Another object of this invention is to provide a resonant converter which is capable of surely performing the start and stop of its oscillation to protect the switching devices used.

Still another object of this invention is to provide a resonant converter which is capable of controlling its output by the combination of self-excited oscillation and a magnetic amplifier.

A further object of this invention is to provide a resonant power source having a resonant reactor connected in series between an input power supply and main switching devices, which is capable of compulsorily stopping its oscillation without destroying the main switching devices due to the surge voltage resulting from the excitation energy stored in the resonant reactor.

A still further object of this invention is to provide a low-loss and low-noise resonant power source which is capable of controlling its output in a switching a power path at a secondary side.

In an aspect of this invention, there is provided a resonant converter comprising, at its primary side, a pair of switching devices, a D.C. power source, a resonant circuit, and a device for controlling the timings of resonance thereby to assure a stabilized oscillation, and prevent the switching devices from suffering from sudden oscillation stop and an undesired surge voltage, and comprising at its secondary side, impedance means for obviating a substantial short-circuit transient state so as to avoid a specific oscillation timing hindering the stabilized oscillation.

Another aspect of this invention, there is provided a resonant converter comprising a resonant circuit consisting of a capacitor and a reactor, a pair of switching devices across the reactor, a D.C. power source with an input reactor connected in series therewith for supplying electric power to the resonant circuit through the pair of switching devices, a transformer having the reactor of the resonant circuit as a primary winding, a self-excited oscillation circuit connected with a tertiary winding of the transformer for alternating the pair of switching devices, a rectifier circuit for rectifying an output of the secondary winding of the transformer, and a smoothing circuit for smoothing an output of the rectifier circuit. In this resonant circuit, short-circuit preventing switching devices are provided between each of the terminals of the secondary winding and each of the input terminals of the smoothing circuit to be alternately switched. An oscillation stopping circuit is provided at the primary side to suppress the start of the oscillation of the self-excited oscillation circuit until the voltage switching the pair of switching device in the self-excited oscillation circuit reaches the value sufficient to place them in their conducting state.

In still another aspect of this invention, there is provided a resonant power source comprising a resonant circuit consisting of a resonance reactor and an oscillation capacitor, a D.C. input power source connected in series with the resonant circuit, a main switching device for intermittently supplying the current from the D.C.

input power source to the oscillation reactor, a diode in anti-parallel connection with the main switching device, and a load circuit wherein electric power is supplied from the resonant circuit to the load circuit. In this resonant power source, a current direction detection device for detecting the direction of the current flowing through the resonance reactor is connected with an oscillation stopping device for turning off the main switching device when the current flows in the direction to regenerate energy to the D.C. input power source, thereby stopping the oscillation. Further, an output control device is also provided to control the operation of the oscillation stopping device at a variable frequency lower than the oscillation frequency of the power source.

The operation of the resonant converter in accordance with this invention will be explained.

When the secondary winding of the transformer falls into a short-circuited state, the resonance current flowing through the primary winding of the transformer flows toward the secondary winding in the short-circuited state, so that voltage is not induced in each of the windings of the transformer. Thus, the voltage can not be applied from the winding for self-excited oscillation to a control electrode of the switching device, thereby stopping the oscillation operation.

The short-circuit preventing circuit, operates to prevent the secondary winding from falling into the short-circuited state and to prevent the resonant current from flowing toward the secondary winding. Thus, the resonant current flows to the capacitor in the resonance circuit and then resonance electric power is applied to the primary winding of the transformer. Accordingly, the voltage driving the switching device is also induced in the winding for self-excited oscillation, thereby continuing the oscillation operation.

The voltage applied to the primary winding of the transformer depends on the voltage in the D.C. input power source, and the voltage induced in the self-excited oscillation winding depends on the turn ratio of the turn number of the primary winding to that of the self-excited oscillation winding. A voltage driving semiconductor switching device such as MOSFET does not fall into the conducting state unless the voltage applied to its control electrode exceeds the gate threshold voltage so that the voltage exceeding the gate threshold voltage must be applied to the switching device from the self-excited oscillation winding.

On the other hand, the circuit arrangement for initiating the oscillation is generally adapted to apply the voltage from the D.C. input power source to the control electrode of the switching device. In this circuit arrangement, the voltage in the D.C. input power source exceeds the gate threshold voltage of the switching device.

The maximum voltage that can be applied to the control electrode is as small as 20 V so that the self-excited oscillation winding is designed to have the turn-number smaller than the primary winding. Therefore, even if the voltage in the D.C. input power source reaches the gate threshold voltage and the switching device falls in the conducting state, the voltage induced in the self-excited winding can not reach the voltage sufficient to drive the switching device. However, the switching device continues to be conductive due to the voltage in the D.C. input power source so that the D.C. voltage is applied to the windings of the transformer, thereby saturating the transformer. The oscillation stopping circuit, serves to prevent the switching device from falling into the conducting state until the voltage exceeding the gate threshold voltage is induced in the self-excited oscillation winding, thereby assuring the initiation of the oscillation.

Further, if a magnetic amplifier is used as the short-circuit preventing circuit, the secondary winding is prevented from falling into the short-circuited state. However, the saturable reactor used in the magnetic amplifier can be regarded as being in substantially the short-circuited state until the excitation current reaches the coersive force $H_c$. Thus, unless the resonance current flowing through the resonance circuit is larger than the value which is enough to magnetize the saturable reactor to $H_c$, the secondary winding is short-circuited, thereby stopping the oscillation. In order to charge the capacitor in the resonance circuit even when the current flowing through the resonance circuit partially flows through the saturable reactor, the resonance current must be previously set to a predetermined value enough to magnetize the saturable reactor to the coercive force $H_c$ or more.

The operation of the resonant power source in accordance with this invention will be explained.

It is assumed that when an electric power is supplied to the load by flowing the oscillation current into the resonance reactor and the resonance capacitor, the current is flowing from the D.C. input power source to the resonance reactor. In this state, when the main switching device is turned off to stop the oscillation, a surge voltage is produced due to the energy stored in the resonance reactor. Now, the direction of the current flowing through the resonance reactor is detected, and when the current is being returned to the D.C. input power source, the main switching device is turned off to stop the oscillation. Then, the current continues to flow a diode in anti-parallel connection with the switching device, thereby preventing the surge voltage from being produced. Further, repeating the above oscillation and its stop allows the output of the power source to be controlled.

DESCRIPTION OF THE PREFERRED EMBODIMENTS

Figure 1:
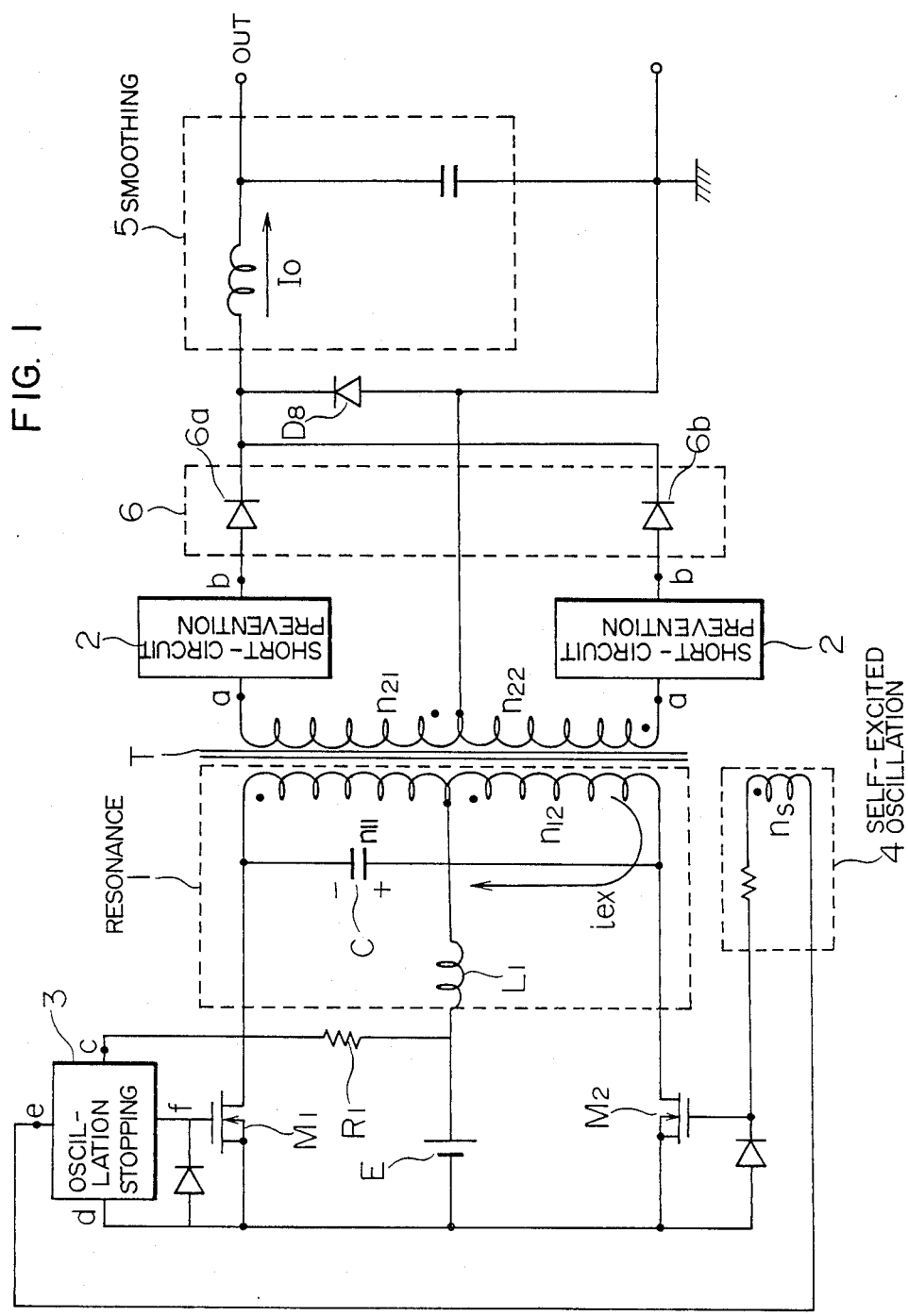
FIG. 1 is a a circuit diagram according to one embodiment of this invention.

Now referring to FIG. 1, one embodiment of this invention will be explained. In FIG. 1, 1 is a resonant circuit constituted by a reactor $L_1$, a capacitor C and an excitation inductance $L_{ex}$ between the primary winding consisting of windings $n_{11}$ and $n_{12}$ of a transformer T. 2 is a short-circuit preventing circuit for preventing the secondary winding of the transformer T from falling in the short-circuited state. 3 is an oscillation stopping circuit. 4 is a self-excited oscillation circuit. 5 is a smoothing circuit. 6 is a full-wave rectifying circuit. E is a D.C. input power source.

Figure 2:
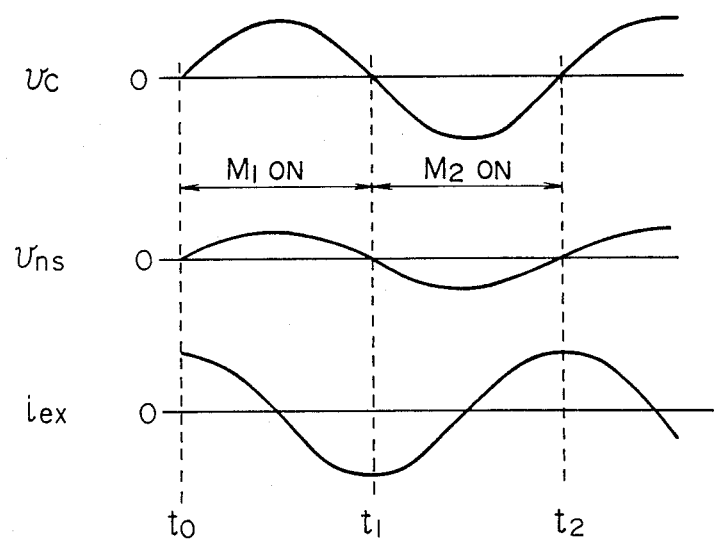
FIGS. 2 and 3 are views for explaining some problems in the prior art system.

The operation of the circuit of FIG. 1 will be explained in connection with the voltage $v_c$ across the resonance capacitor C, the voltage $v_{ns}$ induced across the winding $n_s$ in the self-excited oscillation circuit 4 and the resonance current $i_{ex}$; the respective waveforms of $v_c$, $v_{ns}$ and $i_{ex}$ are illustrated in FIG. 2. It is assumed that $v_c$, $v_{ns}$ and $i_{ex}$ in FIG. 1 have a positive polarity, respectively. When a switching device $M_1$ turns on at a time $t_o$ in FIG. 2, a load current flows through the D.C. input source E, the reactor $L_1$, the winding $n_{11}$ and the switching device $M_1$, and also the oscillation current $i_{ex}$ with the waveform 90° out of phase from $v_c$ flows between the capacitor C and the excitation inductance $L_{ex}$ of the transformer T and gradually charges the capacitor C. Then, the voltage $v_c$ is induced across the secondary winding of the transformer T and thus the load current is supplied to the load through the full-wave rectifying circuit 6 and the smoothing circuit 5. The induced voltage $v_{ns}$ becomes the voltage decided by the turn-ratio of the winding $n_{11}$ to the winding $n_{12}$ and the voltage $v_c$, and biases the gate electrode of the switching device $M_1$. Meanwhile, the resonance current $i_{ex}$ begins to flow in the opposite direction to that shown in FIG. 1. The voltage $v_c$ also begins to decrease and is eventually inverted in its polarity at the time $t_1$. Correspondingly, the induced voltage $v_{ns}$ is also inverted in its polarity. Accordingly, at the time $t_1$, the switching device $M_1$ *turns off and a second switching device $M_2$* turns on.

Figure 3:
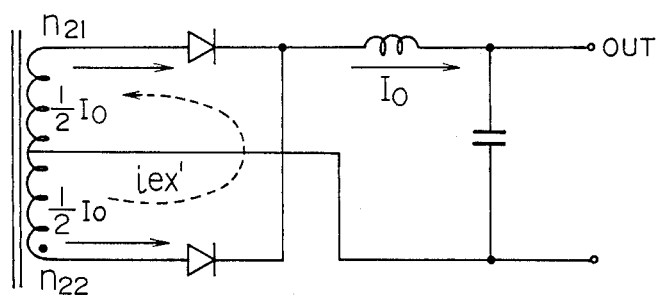

However, in this case, the following difficulty may occur. When the voltage $v_c$ approaches zero, the current flowing through a choke coil in the smoothing circuit 5 equivalently flows through the secondary winding consisting of windings $n_{21}$ and $n_{22}$ of the transformer T so that both diodes 6a and 6b in the full-wave rectifying circuit 6 simultaneously becomes conductive, thus making the secondary windings $n_{21}$ and $n_{22}$ short-circuited. (The currents flowing through the secondary winding $n_{21}$ and $n_{22}$ are shown in FIG. 3. The current $I_o$ flowing through the choke coil in the smoothing circuit can be substantially regarded as an output current from the resonant converter of FIG. 1, and $I_o/2$ flows through both windings $n_{21}$ and $n_{22}$.) When the secondary winding of the transformer is short-circuited, the oscillation current $i_{ex}$ can not charge the capacitor C but flows through the secondary winding as indicated by a dotted line in FIG. 3. ($i_{ex}'$ represents the current obtained by converting $i_{ex}$ into the value at the secondary winding side.) If $i_{ex}'$ is larger than $I_o/2$, the diode 6a connected with the winding $n_{21}$ is non-conductive, thereby preventing the secondary winding from being short-circuited. However, $i_{ex}'$ is generally smaller than $I_o/2$ so that when the output current from the resonant converter is increased, the secondary windings will be short-circuited. Thus, the voltage to be applied to the primary windings disappears and also the voltage is not induced across the winding $n_s$. Accordingly, the switching device $M_2$ may not turn on at the time $t_1$, thereby stopping the oscillation.

In order to obviate such a difficulty, in accordance with this embodiment, the short-circuit preventing circuits 2 are provided for the secondary winding of the transformer T. The short-circuit preventing circuits 2 operate in such a manner that when the switching device $M_1$ is in an on-state, the short-circuit preventing circuit 2 at the winding $n_{21}$ side is an on-state and that at the winding $n_{22}$ side is an off-state, and on the other hand when the switching device $M_2$ is in an on-state, the respective short-circuit preventing circuits 2 are placed in the states inverse to the aforesaid states. Thus, if $M_2$ does not turn on at the time $t_1$, the short-circuit preventing circuit 2 on the $n_{22}$ side becomes off and so $i_{ex}'$ in FIG. 3 can not flow through the secondary winding. Thus, the capacitor C is charged by $i_{ex}$ and the voltage having an opposite polarity to that during the on-period of $M_1$ is applied to the primary winding of the transformer T. Then, since the voltage sufficient to turn on $M_2$ is induced across the winding $n_s$, the oscillation operation can be continued.

Figure 4:
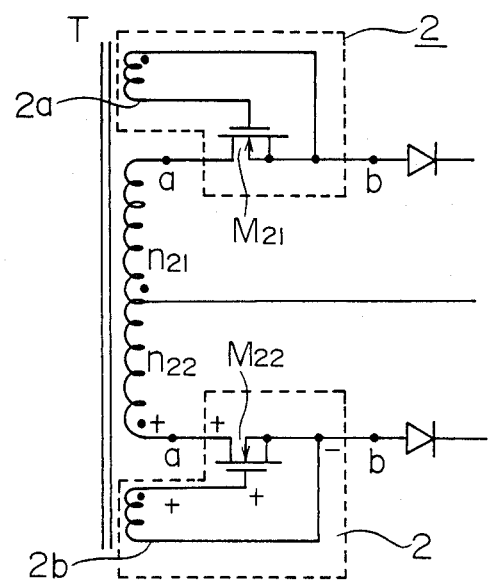
FIGS. 4 to 7 are partial views of FIG. 1 which explain the detailed arrangements of one embodiment of this invention, respectively.

FIG. 4 shows one exemplary arrangement of the short-circuit preventing circuits 2. Each of this circuits is constituted by a switching device $M_{21}$ or $M_{22}$ and a driving winding 2a or 2b placed in the transformer. When $M_1$ is on, the voltage having a positive polarity opposite to the illustrated dot is induced in each of the windings of the transformer T so that $M_{21}$ is on and $M_{22}$ is off. Thus, the electric power is supplied to the load through $M_{21}$. On the other hand, $M_2$ can not turn on unless the voltage having a positive polarity of the illustrated dot is produced across each of the windings, and thus $i_{ex'}$ shown in FIG. 3 can not flow to the secondary winding side at the time $t_1$. Then, $i_{ex}$ charges the capacitor C and hence $M_2$ and $M_{22}$ turn on.

The oscillation stopping circuits 3 will be explained. When the voltage across the D.C. power source E exceeds the gate threshold voltage $v_{th}$ of $M_1$ at the initiation time of oscillation, $M_1$ turns on. When $M_1$ turns on, the capacitor is charged to the value expressed by $$V_{con} = \pi V_{th} \tag{1}$$

Then, the voltage $V_{nsl}$ induced across ns is expressed by $$V_{ns1} = \pi V_{th} \cdot \frac{n_s}{n_{11} + n_{12}} \tag{2}$$

Assuming that the gate threshold voltage is also $V_{th}$, in order to turn on $M_2$ so as to initiate the oscillation, $V_{ns1}$ must satisfy the following expression:

$$\frac{V_{ns1}}{V_{th}} = \pi \frac{n_s}{n_{11} + n_{12}} \geq 1 \tag{3}$$

However, the maximum voltage which can be applied between the gate and source of the MOSFET used as the switching device is as small as 20 V or so, so that the left term of Equation (3) must be set to 1 or less considering the state where E has reached the rated value. Therefore, in order to assure the initiation of the oscillation, it is necessary that $M_1$ is not allowed to turn on until the D.C. power source E increases $V_{ns1}$ of Equation (2) to exceed $V_{th}$.

Figure 5:
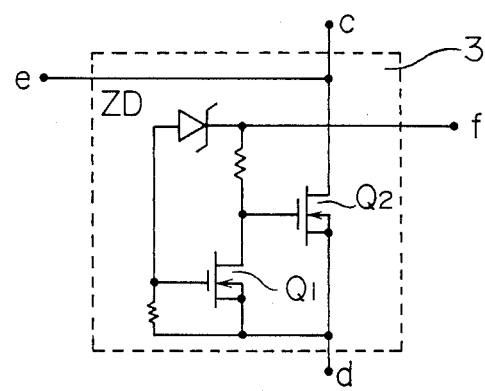

FIG. 5 shows one example of the oscillation stopping circuit 3. In this figure, $Q_1$ remains off unless the voltage across E does not exceed the voltage $V_{ZD}$ defined by a voltage regulating diode ZD. $Q_2$ is conductive only while $Q_1$ is off and it short-circuits a terminal f with a terminal d. The terminals c to f in FIG. 5 correspond to the terminals with like reference symbols in FIG. 1. In the operation of the circuit of FIG. 5, when the voltage across E reaches $V_{ZD}$, $Q_2$ turns off and $M_1$ turns on. Thus, the oscillation of the circuit is surely initiated by providing the voltage regulating diode having the predetermined $V_{ZD}$ satisfying the following equation:

$$V_{ZD} \geqq V_{th} \frac{n_{11} + n_{12}}{\pi n_s} \quad (4)$$

Figure 6:
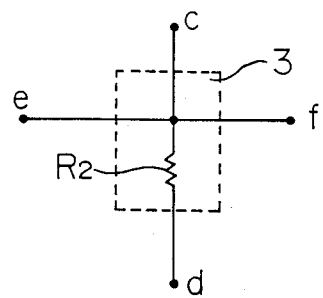

FIG. 6 shows another example of the oscillation stopping circuit 3, in which a resistor $R_2$ is provided. The voltage level in the D.C. input power source which is enough to turn on $M_1$ is decided from the driving resistor $R_1$ shown in FIG. 1 and the resistor $R_2$. Assuming that the voltage across the D.C. input power source is E, the output voltage from the terminal f is $E \cdot R_2/(R_1+R_2)$. Thus, assuming that the voltage across the D.C. input power source when $M_1$ turns on is $E_{on}$, the oscillation can be surely initiated by setting $V_{ns1}$ of Equation (2) so as to satisfy the following condition:

$$\pi \frac{n_s}{n_{11} + n_{12}} \geqq \frac{R_2}{R_1 + R_2} \quad (5)$$

Figure 7:
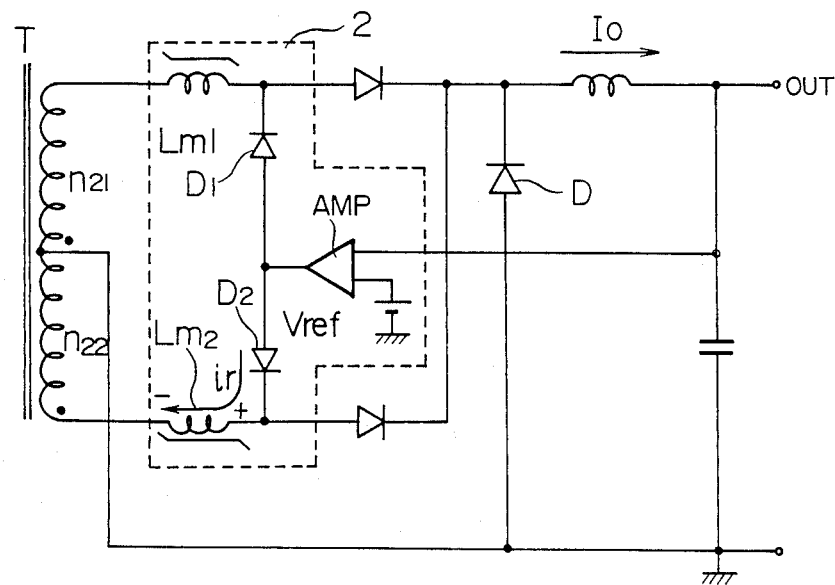

FIG. 7 shows another example of the short-circuit preventing circuit 2, in which a magnetic amplifier is provided therefor. The magnetic amplifier is constituted by saturable reactors $L_{m1}$, $L_{m2}$, diodes $D_1$, $D_2$, an error amplifier Amp, a reference voltage source $V_{ref}$. The output from the entire converter is controlled to be a predetermined voltage decided by $V_{ref}$.

Figure 8:
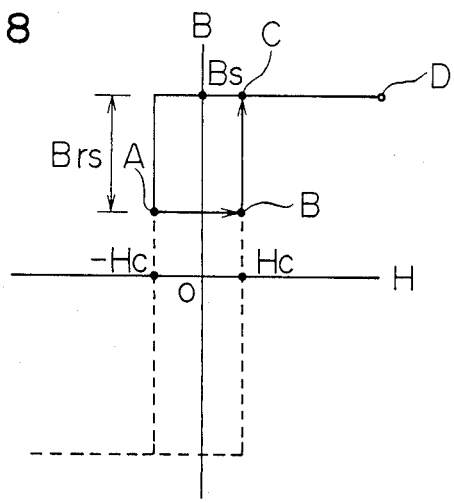
FIG. 8 is a view for explaining the operation of FIG. 7.

The operation of the circuit of FIG. 7 will be explained in connection with a B-H curve of the saturable reactor, as shown in FIG. 8. Now it is assumed that when $M_1$ turns on and $I_o$ flows through the saturable reactor $L_{m1}$, a reset current $i_r$ flows from the error amplifier Amp through the saturable reactor $L_{m2}$, across which the voltage having a polarity as shown is induced, so that the, output from the entire converter is constant, and it is also assumed that the induced voltage has shifted the magnetic flux density of $L_{m2}1$ to point A. Now when $M_2$ turns off, the voltage with the polarity opposite to that shown in FIG. 7 is applied to $L_{m2}$ from the winding $n_{22}$. This voltage shifts the magnetic flux density of $L_{m2}$ from point A to point B, and further increases it towards point C where the magnetic flux density of $L_{m2}$ reaches its saturated magnetic flux density $B_s$. The saturable reactor has a large inductance when its magnetic flux density is located between points B and C. Then it can be essentially regarded as switched off. However, when the magnetic flux density reaches point C thereby to saturate the saturable reactor, the inductance thereof is abruptly reduced to nearly zero. Thus, the load current $I_o$ flows from the winding $n_{22}$ through $L_{m2}$. This current magnetizes $L_{m2}$ to point D. (When $M_2$ is on, $L_{m1}$ is supplied with the reset current $i_r$ and the magnetic flux density of $L_{m1}$ is reset from point D through point C to point A.) Assuming that the voltage induced across the winding $n_{22}$ when $M_2$ is on is $V_2 \sin\omega t$, the period $t_{s1} \sim t_{s2}$ in the following equation can be regarded as a period when $L_{m2}$ is off.

$$\frac{V_2}{n_M S_M} \int_{t_{s2}}^{t_{s1}} \sin\omega t\, dt = \Delta B_{rs} \quad (6)$$

where $n_M$ is the turn number of $L_{m2}$ and $S_M$ is a sectional area of the core thereof. $\Delta B_{rs}$ in Equation (6) can be controlled by the reset current $i_r$ supplied from the error amplifier Amp so that the output voltage of the entire converter can be constant.

Now the operation of $L_{m2}$ at the time $t_1$ of FIG. 2 is as follows. $L_{m2}$ has been reset to point A of FIG. 8 during the period of $t_0 \sim t_1$. When $M_2$ is going to be conductive, the voltage having a positive polarity of the shown point begins to be induced across the winding $n_{22}$ and also the voltage having the polarity opposite to that as shown begins $t_o$ to be applied to $L_{m2}$. Then, the magnetic flux density of $L_{m2}$ shifts from point A to point B. In this case, during the period when the magnetic flux density is shifting from point A to point B, that is, the intensity of the magnetic field of $L_{m2}$ is shifting from $-H_c$ (coercive force) to $+H_c$, $L_{m2}$ is substantially short-circuited. The current $i_L$ required to magnetize the magnetic field intensity of $L_{m2}$ to $H_c$ is expressed by $$i_L = H_c \frac{l_M}{n_M} \quad (7)$$

where $l_M$ is the magnetic path length of the core of $L_{m2}$. Thus, if the current obtained, when the oscillation current flowing between the capacitor C and the excitation inductance $L_{ex}$ on the transformer primary side in FIG. 1 is converted into the value on the secondary side, is smaller than $i_L$ in Equation (7), this current short-circuits from the winding $n_{22}$ through $L_{m2}$ and a feed-back diode $D_f$ as shown in FIG. 1. Incidentally, since the output current $I_o$ flows through $D_f$, $D_f$ is short-circuited.

If the voltage across the D.C. input power source is E, the capacitor C is charged to $\pi E$. The maximum value $i_{exp}$ of the oscillation is expressed by $$i_{exp} = \pi E \sqrt{\frac{C}{L_{ex}}} \quad (8)$$

The current $i_{exp2}$ obtained when $i_{exp}$ is converted into the value on the secondary winding side is written by $$i_{exp2} = \frac{n_{11} + n_{12}}{n_{22}} i_{exp} \quad (9)$$

When $i_L \geqq i_{exp2}$ in Equations (7) and (9), the entire oscillation current flows to the secondary winding side and thus the capacitor C can not be charged, thereby stopping the oscillation. Such a phenomenon, which occurs only when the self-excited oscillation and the magnetic amplifier are combined, is not worth considering if the self-excited oscillation is not adopted. In this case, in order to prevent the oscillation from being stopped, the values of C and $L_{ex}$ must be selected to satisfy the condition:

$$i_{exp2} > i_L \quad (10)$$

Under this condition, a part of the oscillation current flows to the secondary winding side through $L_{m2}$, but the remaining oscillation current charges the capacitor C the voltage across which is applied to the primary windings of the transformer, thereby continuing the oscillation.

Figure 9:
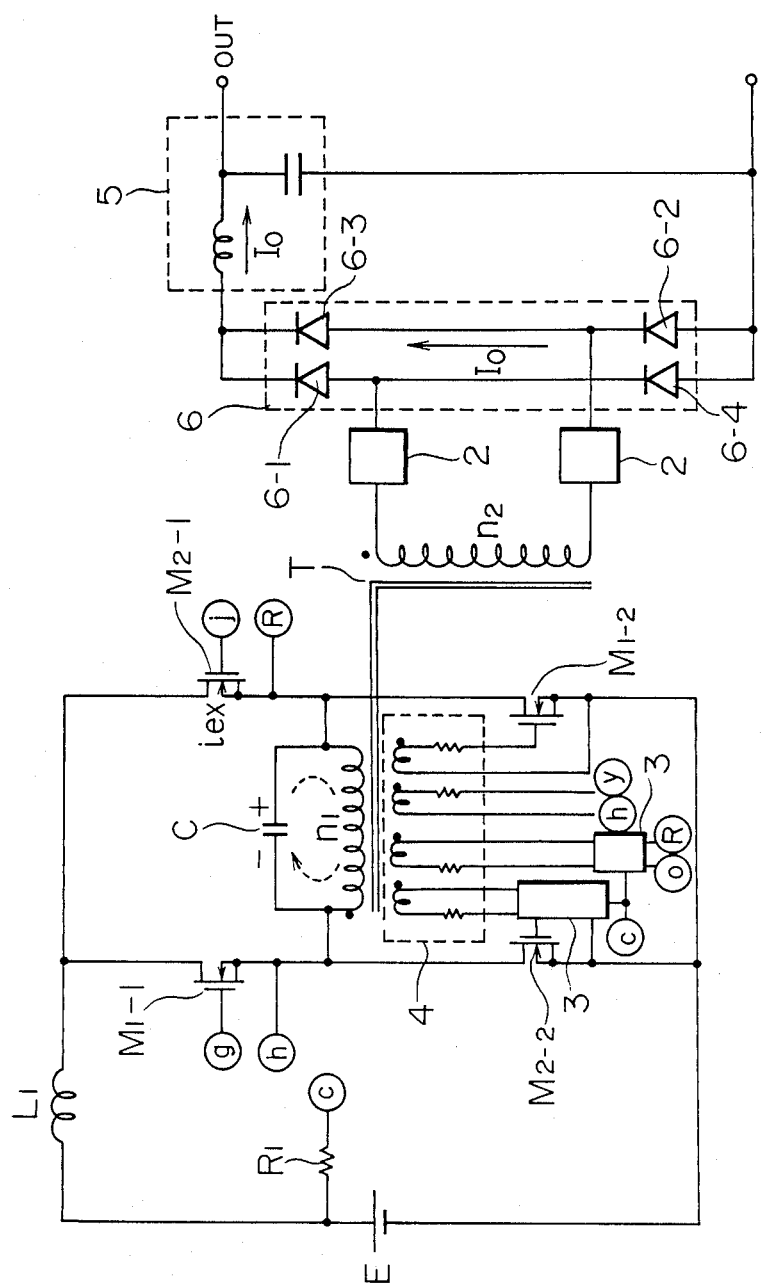
FIG. 9 is a circuit diagram according to another embodiment of this invention.

FIG. 9 shows a resonant converter according to another embodiment of this invention. In this embodiment, the main circuit of the resonant converter is constituted by four switching devices of $M_{1-1}$, $M_{1-2}$, $M_{2-1}$ and $M_{2-2}$ which are in a bridge connection. The resonant circuit is constituted by $L_1$, C and the excitation inductance across a primary winding $n_1$.

Now, if $M_{2-1}$ and $M_{2-2}$ are conductive, the resonance capacitor C is charged with the polarity as illustrated, and the oscillation current $i_{ex}$ shown in FIG. 2 flows as shown in FIG. 9. At the time $t_1$ as shown in FIG. 2, the charging current across C becomes zero due to the resonance operation by the resonance capacitor C and the excitation inductance of the transformer T and also the voltage applied to the primary winding $n_1$ becomes zero. Then, the current $I_o$ flowing through the smoothing circuit 5 flows through rectifying devices (diodes) 6-1 and 6-4 connected in series or rectifying devices 6-3 and 6-4 connected in series in the rectifying circuit 6. Thus, the rectifying circuit 6 is short-circuited and the excitation current in the transformer is emitted from the secondary winding $n_2$ from the rectifying circuit 6. The problem when the secondary winding side has been short-circuited is the same as the embodiment of FIG. 1 and the switching devices $M_{1-1}$, $M_{1-2}$, $M_{2-1}$, and $M_{2-2}$ may be destroyed. In order to obviate this difficulty, the short-circuit preventing circuits as shown in FIG. 4 are provided for the secondary $n_2$ winding of the transformer T, thereby continuing the self-excited oscillation. Incidentally, although not shown in FIG. 4, MOS-FET used as the switching device of the embodiment in which a diode is connected in parallel between its source and drain can surely operate also in the embodiment of FIG. 9.

In the embodiment of FIG. 1, the secondary winding of the transformer may be provided with the center tap as shown in FIG. 1. In this case, the magnetic amplifier as shown in FIG. 7 may be provided as a short-circuit preventing circuit.

Figure 10:
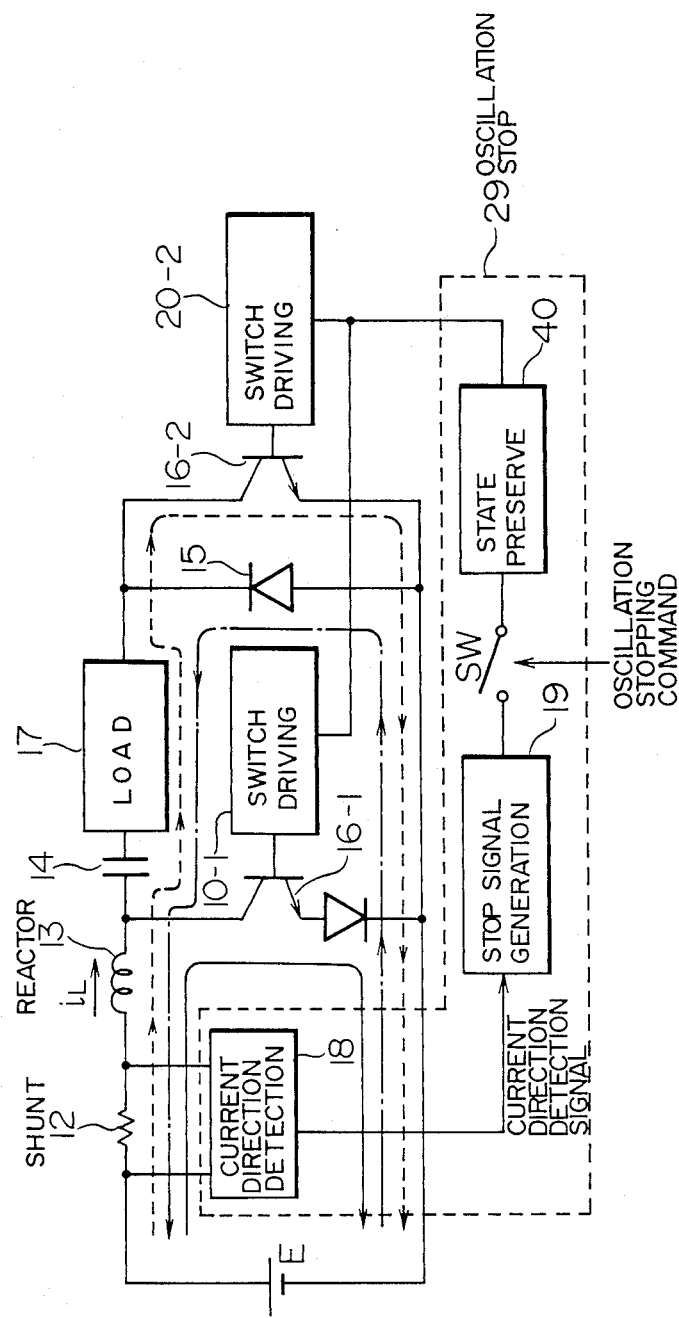
FIGS. 10 to 15 are circuit diagrams according to several other embodiments of this invention, respectively.

The resonant power source according to a further embodiment of this invention will be explained with reference to FIG. 10. In FIG. 10, E is a D.C. input power source; 12 is a shunt resistor for detecting a reactor current; 13 is a resonance reactor; 14 is a resonance capacitor constituting a resonant circuit together with the resonance reactor 13; 16-1 and 16-2 are main switching devices, respectively 15 is a diode in anti-parallel connection with a main switching device 16-2; 17 is a load circuit; 18 is a current direction detecting circuit for deciding the direction of the reactor current $i_L$ on the basis of the voltage produced across the shunt resistor 12; 19 is a stop signal producing circuit (oscillation stopping means) for producing a signal for turning off the main switching devices 16-1 and 16-2 in accordance with the signal from the current direction detecting circuit 18; 20-1 and 20-2 are driving circuits for driving the main switching devices 16-1 and 16-2, respectively; 40 is a state preserving circuit; and SW is a switching device which is turned on by an oscillation stopping command. This oscillation stopping instruction may be caused by several factor during operation of the resonant power source.

In operation, when the main switching device 16-1 turns on, the current flowing along the current path shown in a solid line linearly increases. When the main switching device 16-1 turns off after a predetermined elapsed time, the initial value $i_{Lo}$ of the reactor current is set. If another main switching device 16-2 is turned on simultaneously when the main switching device 16-1 is turned off, the current which has been flowing along the solid line path flows in turn along the current path indicated by a broken line. From this time, the current has the initial value $i_{Lo}$ and provides an oscillation waveform which is defined by the values of the resonance reactor 13 and the resonance capacitor 14 and a circuit in the load circuit 17. After a predetermined elapsed time, the current $i_L$ is reversed in its flowing direction from the direction of charging the oscillation capacitor 14 to that of discharging it, and starts to flow along the current path indicated by a one-dot chain line in FIG. 10.

The main switching device 16-2 is turned off in order to stop the oscillation on the basis of the oscillation stopping command supplied from outside. Its timing will be explained below. If the switching device 16-2 turns off while the reactor current flows along the broken line current path, the reactor current $i_L$ provides its value change $di_L/dt$ corresponding to the turn-off speed of the main switching device 16-2, thus producing a surge voltage of $L \cdot (di_L/dt)$ (L: the inductance of the reactor 13) with its negative polarity of an illustrated point mark across the resonance reactor. This surge voltage is added to the voltage across the D.C. input power source E and the resultant voltage is applied to the main switching device 16-1. In this case, if the applied voltage becomes higher than the rated voltage of the main switching device 16-1, this switching device will be destroyed.

On the other hand, if the main switching device 16-2 is turned off while the reactor current flows along the one-dot chain line current path, the reactor current does not change. Thus, the surge voltage is not produced across the resonance reactor 13 and so the main switching device 16-2 will not be destroyed.

In accordance with this embodiment the stop of the oscillation is performed as follows. The shunt resistor 12 and the current direction detecting circuit 18 are provided to detect the direction of the reactor when the oscillation stop means 19 operates by the oscillation stopping command which can be arbitrarily produced. If it is detected that the reactor current $i_L$ is flowing in the negative direction (of returning the electric power to the D.C. input power source), the oscillation stop signal generating circuit 19 produces a turn-off signal. The main switching device 16-2 is turned by this signal through the driving circuit 20-2. The off-state of the main switching device 16-2 is preserved by the state preserving circuit 40. Thus, the oscillation is stopped.

In this way, since the main switching device 16-2 can be surely turned off while the reactor current $i_L$ flows along the broken line current path, the main switching device 16-1 can be prevented from being destroyed.

Figure 11:
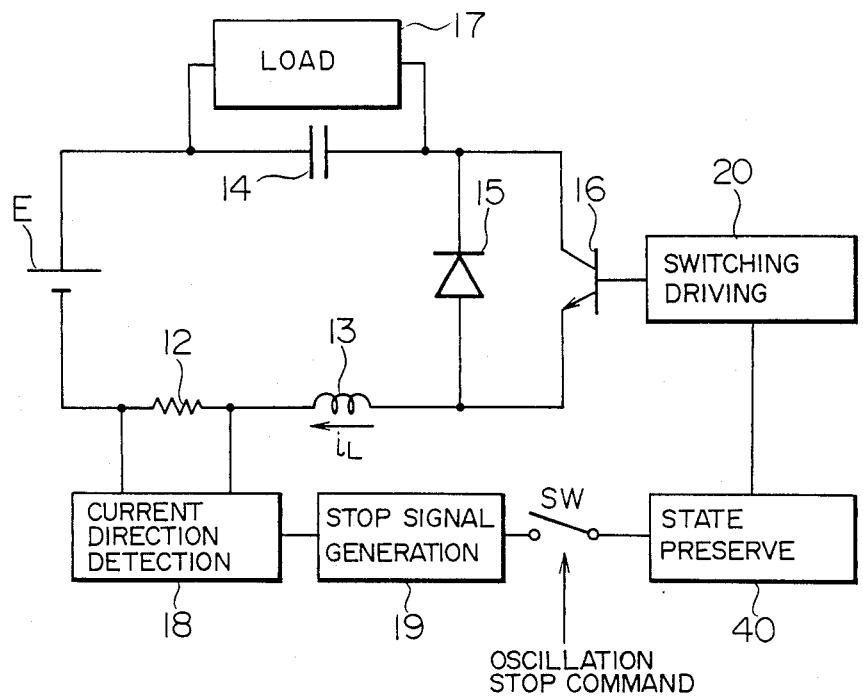

FIG. 11 shows another embodiment of the resonant power source according to this invention. In the embodiment of FIG. 11, the resonance capacitor 14 is connected in parallel with the load circuit 17. The embodiment of FIG. 11 performs essentially the same operation as the embodiment of FIG. 10 except that the electric power is supplied to the load circuit 17 in the form of voltage, and provides the same effect as the latter.

Figure 12:
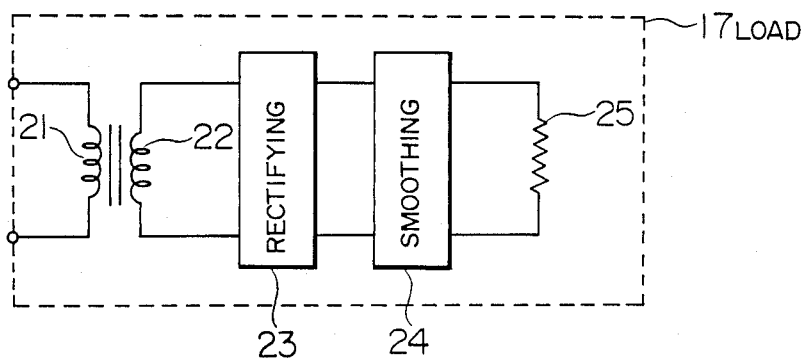
Figure 13:
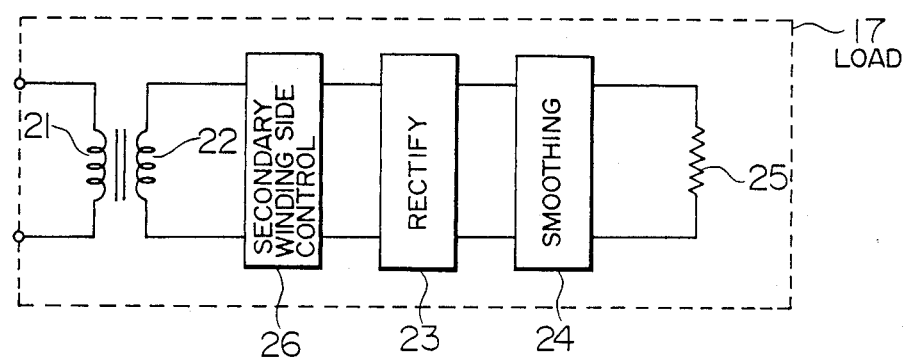

FIGS. 12 and 13 are examples of the arrangement of the load circuit 17. The load circuit of FIG. 12 comprises a main transformer, consisting of a first winding 21 and a second winding 22, and a first output circuit consisting of a rectifying circuit 23 and a smoothing circuit 24 which are connected with the second winding 22, which supplies a D.C. voltage to a load resistor 25. The load circuit of FIG. 13 comprises a second output circuit further including secondary winding side control means 26 which is connected between the secondary winding 22 and the rectifying circuit 23 and serves to stabilize to the output voltage on the secondary winding side (e.g. magnetic amplifier, pulse width modulation circuit, chopper control circuit, series dropper control circuit, etc.). Either of the circuits of FIGS. 12 and 13 can be equally employed as the load circuit in the embodiment of FIGS. 10 and 11.

Figure 14:
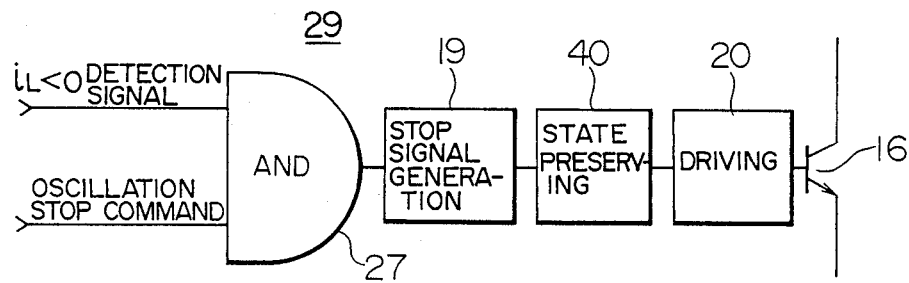

FIG. 14 shows another example of the arrangement of the oscillation stopping means 29. The stopping of the oscillation is performed as follows. A logical product of the $i_L<0$ detection signal (which represents that the reactor current $i_L$ flows in the direction of returning or regenerating an electric power to the D.C. input power source E) and the oscillation stopping command is provided in an AND gate 27. Then, the oscillation stopping signal is generated. The main switching device 16 is turned off and the turn-off state thereof is preserved, thereby stopping the oscillation.

Figure 15:
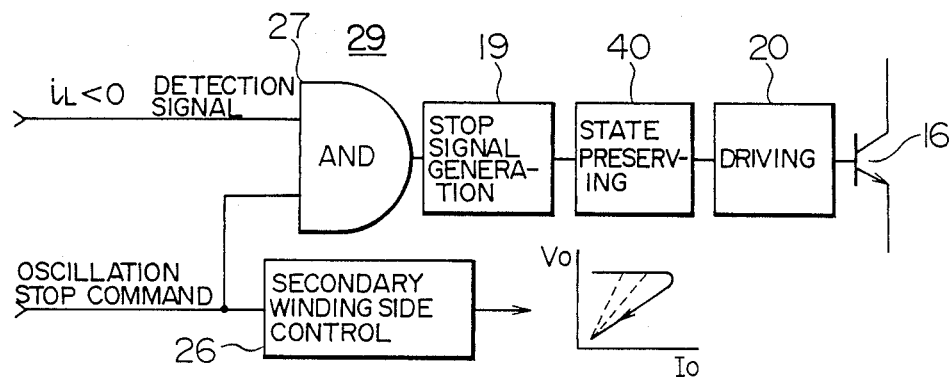

FIG. 15 is still another example of the arrangement of the oscillation stopping means 29. In this example, like the example of FIG. 14, the logical product of the $i_L<0$ detection signal and the oscillation stopping command is provided in the AND gate 27 to turn off the main switching device 16. Also, the oscillation stopping instruction is input to the secondary winding side control means 26 to stop or decrease the supply of the electric energy to the output controlled by the secondary control means 26. Either of the arrangements of FIGS. 14 and 15 can provide the same effect as in the embodiments of FIGS. 10 and 11.

Figure 16:
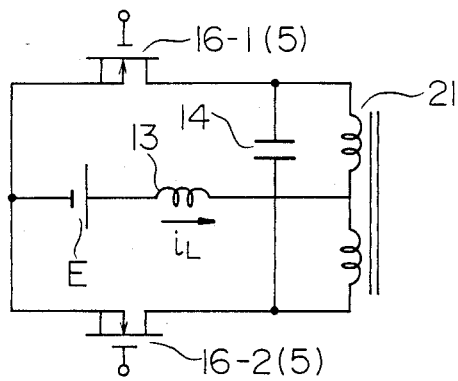
FIG. 16 is a reference circuit diagram for explaining the embodiments of this invention.

FIG. 16 shows a primary winding side circuit of the resonant power source having the main circuit arrangement different from FIGS. 10 and 11. The previously mentioned technical idea of this invention is also applicable to this circuit. In this circuit, one end of the series circuit of the D.C. power input source E and the resonance reactor 13 is connected with the central point of the transformer primary winding 21. The main switches 16-1 (5) and 16-2 (5) are connected between the other end of the above series circuit and both terminals of the transformer primary winding 21, respectively. Further, the resonance capacitor 14 is connected across the primary winding 21. Also in operation of this circuit, if both main switching devices 16-1 and 16-2 turn off while reactor current $i_L$ flows in the positive direction, a surge voltage is generated across the resonance reactor 13. Thus, the above-mentioned technical idea should be applied in stopping the oscillation. Particularly, in such a circuit arrangement, the reactor current takes a sum of the resonance current and the value obtained when the load current is converted into that on the primary winding side so that it is necessary to decrease the load current so as to provide the period when $i_L$ is negative, in the oscillation stopping means as shown in FIG. 15.

Figure 17:
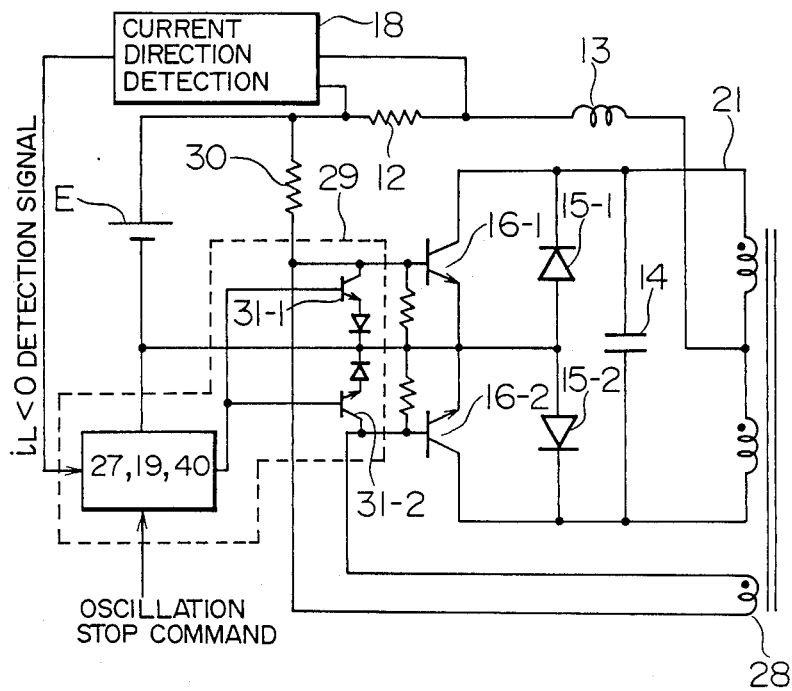
FIGS. 17 to 22 are circuit diagrams according to still other embodiments of this invention, respectively.

FIG. 17 shows the circuit arrangement in which the technical idea of this invention is applied to the resonant power source having the main circuit arrangement shown in FIG. 16. Only the primary winding circuit is shown. In the circuit of FIG. 17, a tertiary winding 28 connected with the respective base terminal of the switching devices 16-1 and 16-2 is provided for the main transformer to provide a positive feedback. Also, an actuation circuit 30 is provided to perform the self-excited oscillation.

In operation, when the $i_L<0$ detection signal and the oscillation stopping command are simultaneously input to the oscillation stop means 29, the switching means 31-1 and 31-2 included therein are turned on thereby to turn off the main switching devices 16-1 and 16-2. Thus, the oscillation can be safely stopped.

Figure 18:
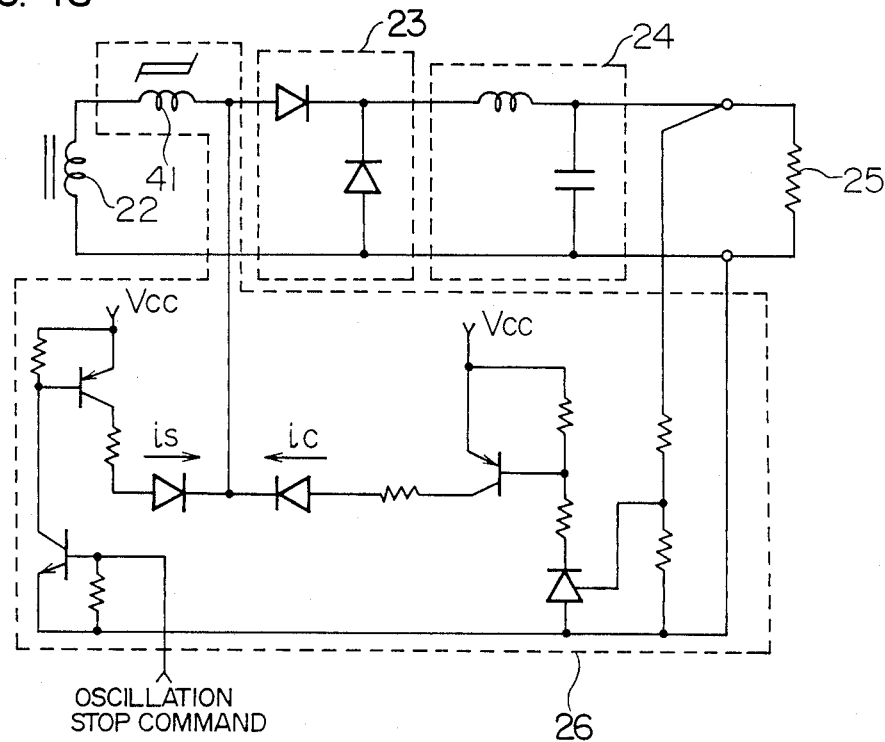
Figure 19:
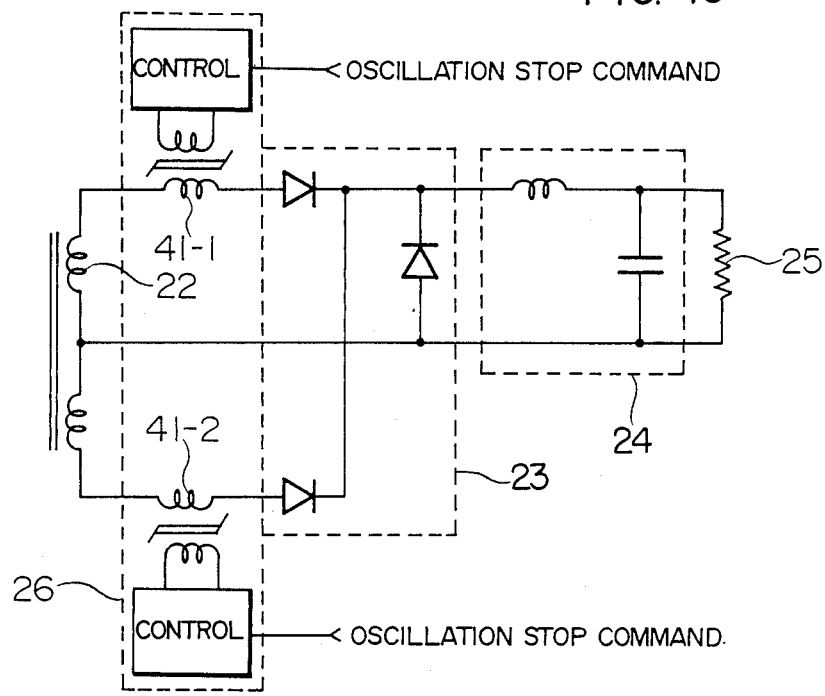
Figure 20:
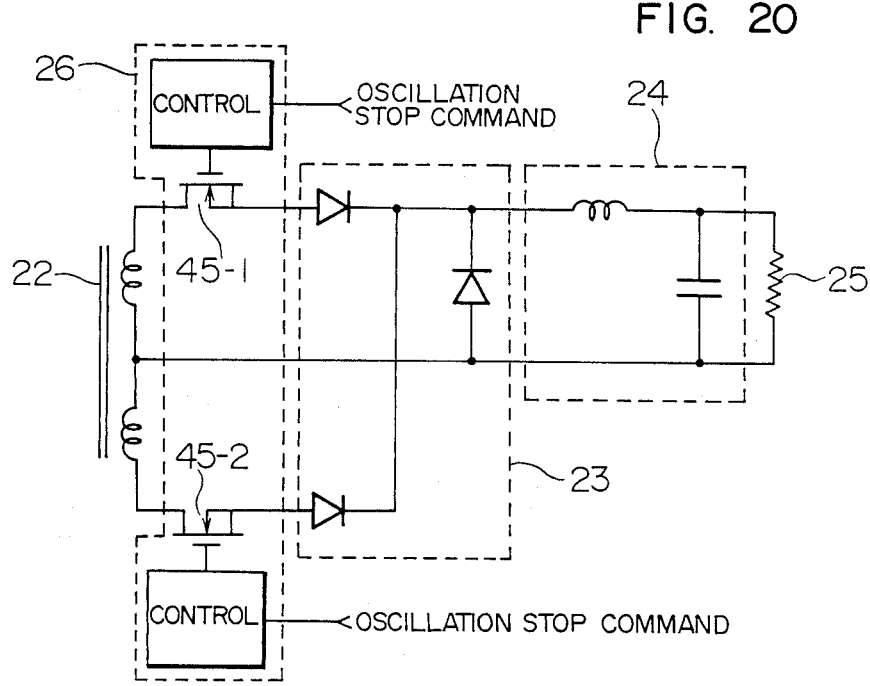

FIGS. 18 to 20 show embodiments of the oscillation stopping means 29 as shown in FIG. 15 in which the output is stopped or decreased by the secondary winding side control means 26. Only the secondary winding side circuit is shown.

FIG. 18 shows the secondary winding side control means 26 which is a magnetic amplifier with its secondary winding side connected with the half-wave rectifying circuit 23. In a normal state, the control current $i_c$ which serves to control the output voltage to be constant resets a saturable reactor 41 by a necessary amount of magnetic flux. If the oscillation stopping command is input, the current $i_s$ also resets the saturable reactor 41. If the magnetic flux reset amount of the reactor 41 by the current $i_s$ is set to a predetermined value (which exceeds the magnetic flux change corresponding to the integration value of the voltage during the period when the voltage with a positive polarity of an illustrated point mark is generated), the electric energy is not sent to the output, thereby surely providing a period when $i_L<0$. Thus, the oscillation stopping means 29 shown in FIG. 15 can be implemented.

FIG. 19 shows the secondary winding side control means 26 which is magnetic amplifiers 41-1 and 41-2 with their secondary winding side connected with the full-wave rectifying circuit 23. The circuit for controlling the magnetic flux reset amount in the saturable reactors 41-1 and 41-2 can be constituted in the same manner as in FIG. 18 and also performs the same operation as the latter.

FIG. 20 shows the secondary winding side, control means 26 which is a pulse width modulation circuit constituted by semiconductor switching devices 45-1 and 45-2. In operation, when the oscillation stopping command is input, both semiconductor switching devices 45-1 and 45-2 are turned off, so that the electric energy is not sent to the output. The secondary side control means of FIG. 20 can also perform the same effect as the embodiments of FIGS. 18 and 19.

Figure 21:
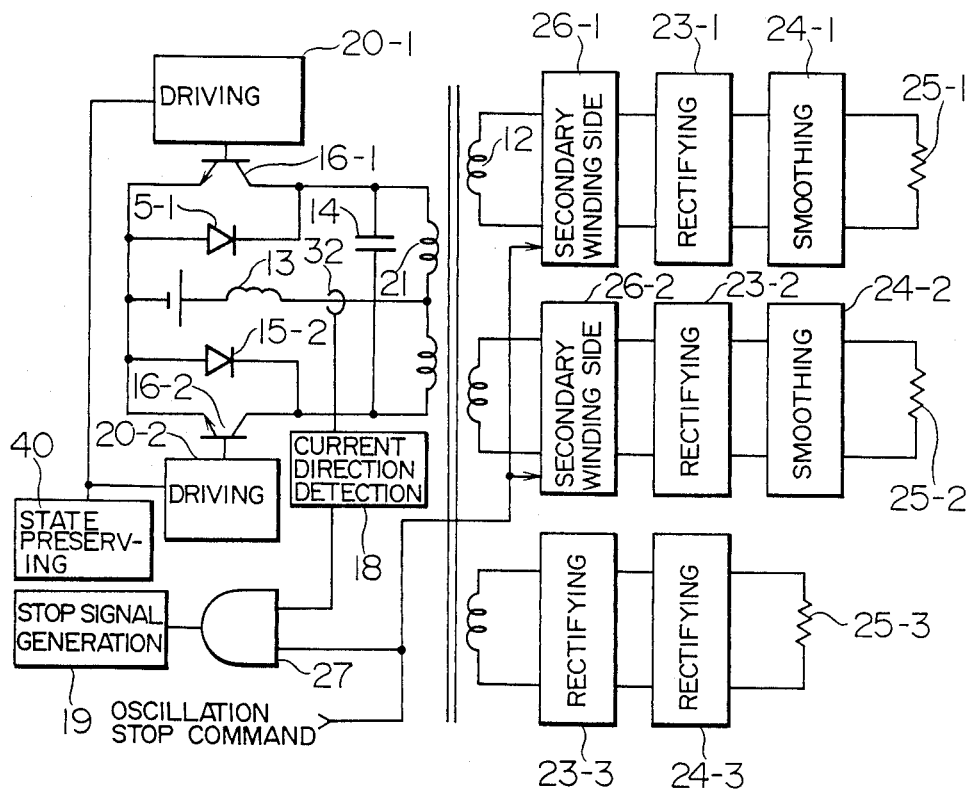

FIG. 21 shows an embodiment of the resonant power source having a plurality of outputs according to this invention. In this embodiment, it is assumed that the second output circuit consisting of the secondary winding side control means 26-1 and 26-2 provides two outputs and the first output circuit which is not provided with the secondary winding side control means provides one output. A current transformer 32 is provided to detect the direction of the reactor current $i_L$.

In operation, when the oscillation stopping command is input, first, the load current in the second output circuit is stopped by the secondary winding side control means 26-1 and 26-2. Then, the current obtained when the load current of the reactor current is converted into that on the primary winding side is decreased. Therefore, if the value obtained when the load current in the first output circuit is previously set to be smaller than the A.C. component of the reactor current $i_L$, the period when the reactor current $i_L$ is negative can be provided. The moment the reactor current $i_L$ becomes negative, the oscillation stopping signal is sent from the circuit 19 to the driving circuits 20-1 and 20-2 thereby turning off both main switching devices 16-1 and 16-2. The state preserving circuit 40 operates to continue to send the oscillation stopping signal, thereby stopping the oscillation of the circuit.

Since such an operation is performed in the state $i_L<0$, the oscillation can be stopped without any fear of destroying the main switching devices 16-1 and 16-2. Incidentally, if the circuit normally operates to provide the period when the reactor current $i_L$ flows in the negative direction ($i_L<0$), the operation of reducing or stopping the load current by the oscillation stopping command is not required as understood from the aforementioned explanation.

Figure 22:
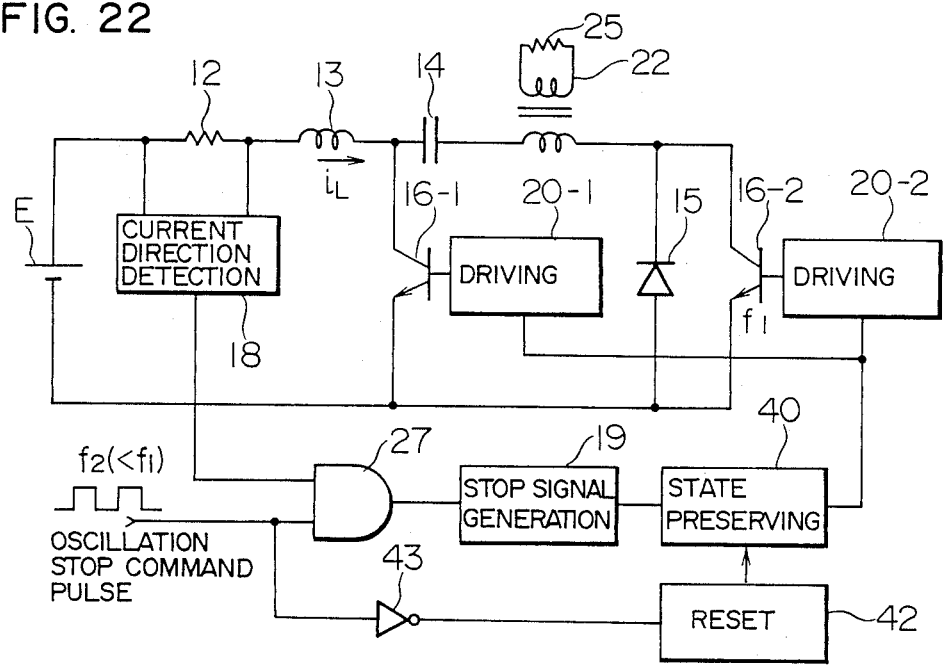

FIG. 22 shows a resonant power source according to a still further embodiment of this invention. In this embodiment, the load circuit shown in FIG. 10 is constituted by a main transformer and a load resistor, and the oscillation stopping command is input in the form of a pulse train at a frequency $f_2$ lower than the on-off frequency $f_1$ of the main switching devices. Also, a NOT gate 43 and a reset circuit 42 are provided to reset the state preserving circuit 40 for each period of the oscillation stopping command pulse train.

The main circuit operates in the same manner as in FIG. 10. The operation peculiar to this embodiment will be explained with reference to FIG. 23.

When the oscillation stopping command is input at the time $t=t_0$ and the current $i_L$ is changed from a positive value to zero, the main switching device 16-2 turns off. Thereafter, at the time $t=t_1$ when the resonance half-period during which the reactor current $i_L$ is negative elapses and the reactor current $i_L$ is changed from a negative value to zero, the reactor current $i_L$ is stopped. Thus, the electric energy supply to the load register 25 is stopped to provide an oscillation stopping state. When the oscillation stopping command is released at the time $t=t_2$, the state preserving circuit 40 becomes operable by a signal from the reset circuit 42, thereby resuming the oscillation of the circuit. Such an operation is repeated for each period T. Incidentally, if the oscillation period Ta is changed, the period during which the current is supplied to the load resistor 25 is also changed, so that the electric energy supplied to the load resistor 25 can be changed. Also, Ta can be controlled so that the electric energy supplied to the load resistor 25 is constant.

Figure 24:
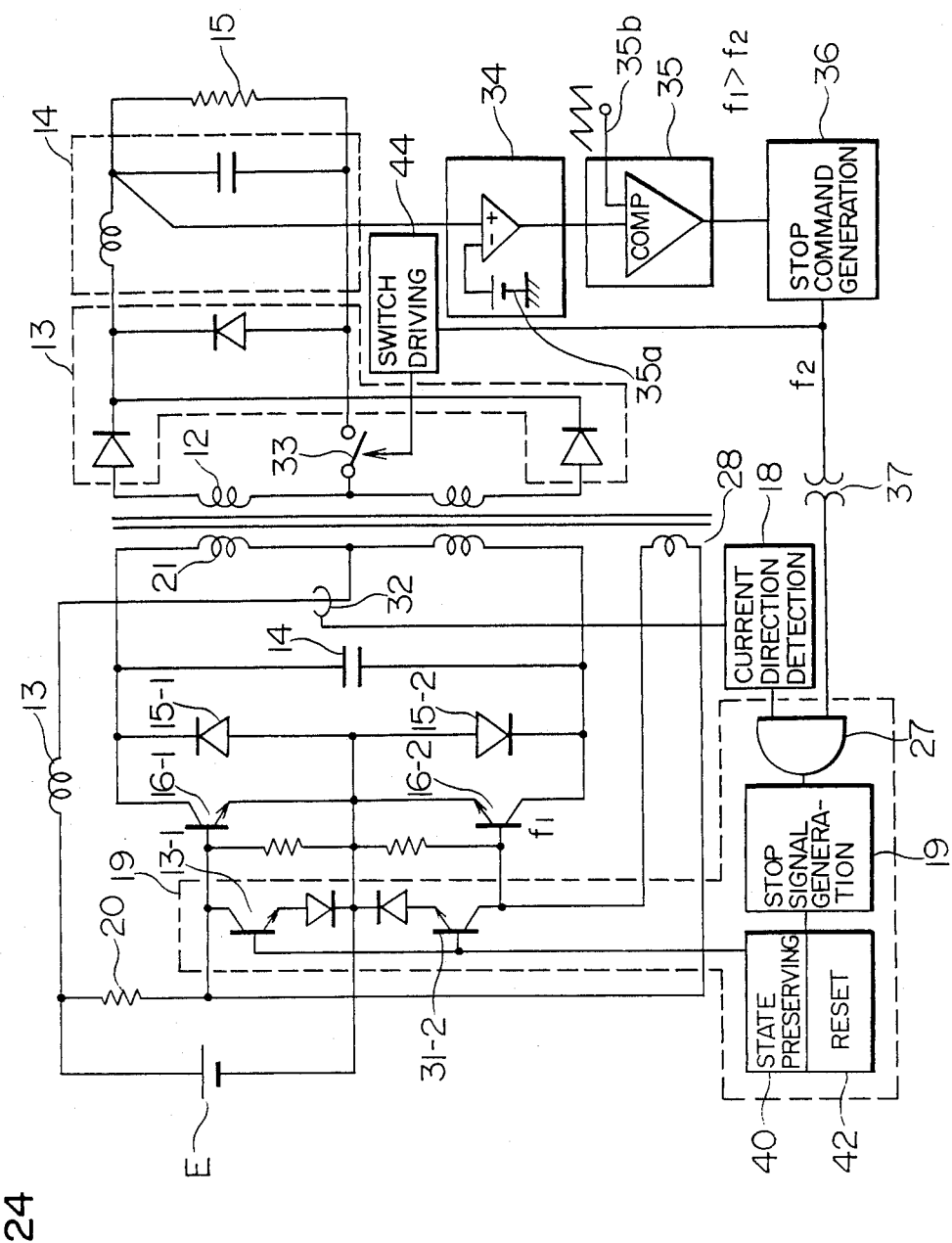

FIG. 24 shows an embodiment in which the output is controlled in accordance with this invention. The circuit on the primary winding side of the transformer is the same as the embodiment of FIG. 17.

Figure 23:
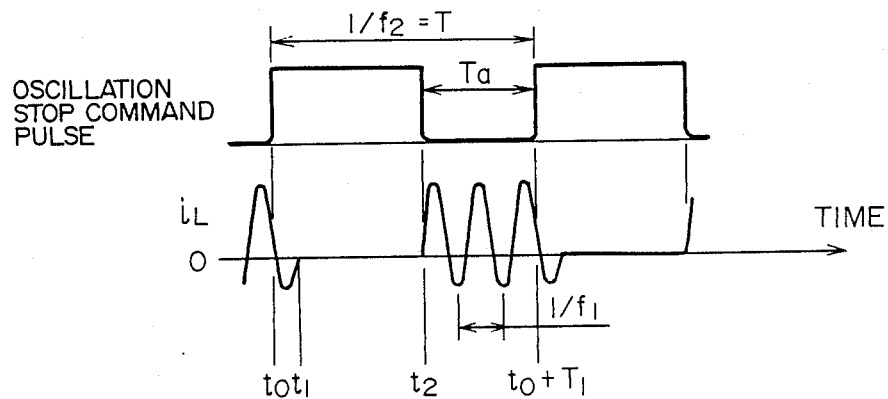
FIG. 23 is a current waveform chart for explaining the embodiments of this invention.

In operation, the output voltage is detected by an output detection circuit 34. A pulse modulated by the difference between a saw-tooth wave from a terminal 35b and a reference voltage 35a is generated by a modulated pulse generating circuit 35. The output therefrom is input to an oscillation stopping command generating circuit 36 to produce an oscillation stopping command pulse train modulated in accordance with the output voltage. 37 denotes a signal for insulating the primary winding from the secondary winding. When the oscillation stopping command is output from the oscillation stopping command generating circuit 36, the switch 33 is opened by a switch driving device 44 thereby stopping the current supplied from the transformer to the load. When the reactor current $i_L$ detected by the current transformer 32 becomes negative, the circuit stops the oscillation. Thereafter, if the oscillation stopping command is released, the oscillation stop state is reset by the reset circuit 42. Thus, the switch 33 is closed and the circuit resumes the oscillation through the actuation circuit 30, thereby supplying the electric energy from the transformer to the load. The output voltage can be controlled to be constant since the period during which the circuit continues the oscillation is set in accordance with the output voltage. More specifically, when the load current is increased so as to reduce the output voltage, the oscillation period corresponding to Ta in FIG. 23 is lengthened. On the contrary, when the load current is decreased so as to increase the output voltage, the oscillation period is shortened. Thus, the output voltage can be controlled to be constant. Incidentally, in this embodiment, if the circuit normally operates to provide the reactor current $i_L$ flows in the negative direction ($i_L<0$), the switch 33 and switch driving device 44 are not naturally required.

Figure 25:
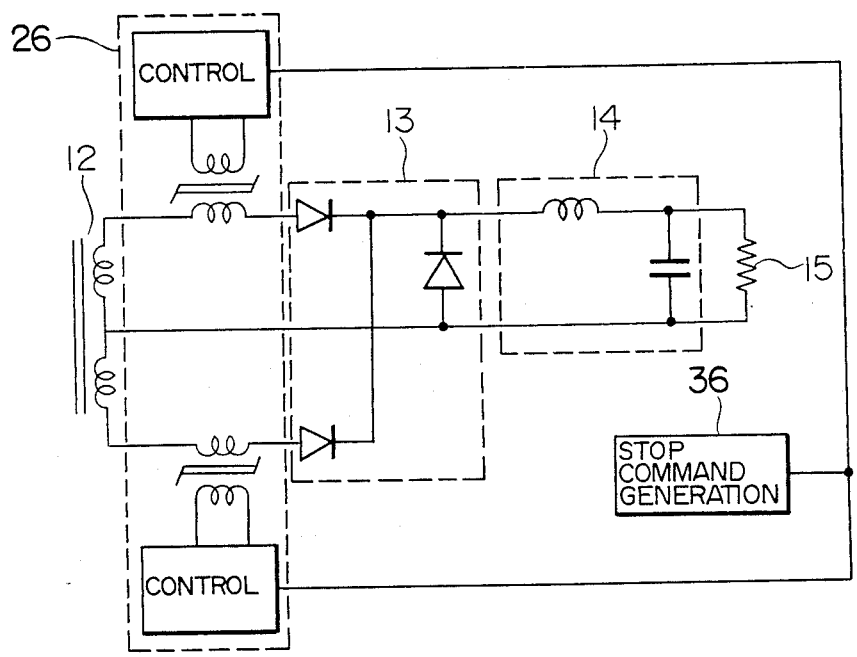
FIGS. 24 and 25 are circuit diagrams according to yet other embodiments of this invention, respectively.

FIG. 25 shows an embodiment in which the supply of the electric energy from the transformer on its secondary winding side in FIG. 24 is stopped by the secondary winding side control means 26 using the magnetic amplifier. The circuit of FIG. 25 operates in the same manner as the embodiments of FIGS. 18 and 19 and provides the same effects as the embodiment of FIG. 24.

We claim:

1. A self-excited resonant converter comprising:
   a resonant circuit having a capacitor and a reactor;
   a D.C. power source for supplying a source current to said resonant circuit;
   a transformer having a primary winding, a secondary winding and a third winding, said primary winding including the reactor in said resonant circuit;
   a pair of main switching devices wherein each of said main switching devices is connected to a different end of said primary winding, and said third winding is connected to control electrodes associated with each of said main switching devices;
   impedance means connected with both ends of said secondary winding, wherein said impedance means is rendered off between a period of time beginning with an inversion of resonant voltage in said capacitor and ending when said main switching devices begin conducting; and
   rectifying means connected in series with said impedance means, respectively, for rectifying the outputs from said secondary winding into an output;
   whereby said self-excited resonant converter operates such that said main switching devices are made off and on in synchronism with voltage inversions of said capacitor.

2. A resonant converter according to claim 1, wherein each of said impedance means comprises a driving winding provided in said transformer and transistor means which is driven by the voltage generated in accordance with the resonant current flowing from said resonant circuit into said driving winding through said transformer.

3. A resonant converter according to claim 2 wherein said rectifying means has diodes connected in series with one of said transistor means.

4. A self excited resonant converter comprising:
a resonant circuit having a capacitor and a reactor;
a pair of switching devices connected with both ends of said reactor;
a D.C. power source, connected in series with an input reactor, for supplying electric power to said resonant circuit through said pair of switching devices;
a transformer having said reactor in said resonant circuit as a primary winding;
a self-excited oscillation circuit connected with control electrodes associated with said switching devices for alternately switching said pair of switching devices;
a rectifying circuit for rectifying the outputs from a second winding of said transformer;
a smoothing circuit for smoothing the outputs from said rectifying circuit; and
a pair of short-circuit prevention switching circuits which are connected in series between each end of said secondary winding and each input terminal of said rectifying circuit, and alternately switched in synchronism with voltage inversions in said capacitor to cancel the overlap of the currents flowing along two paths of said rectifying circuit.

5. A resonant converter according to claim 4, wherein said short-circuit prevention circuit is constituted by a magnetic circuit.

6. A resonant converter according to claim 5, wherein the value obtained when the resonance current flowing through said resonance circuit is converted into the value on the secondary winding side is larger than the excitation current for a saturable reactor used in said magnetic amplifier.

7. A resonant converter comprising:
a resonant circuit having a capacitor and a reactor;
a pair of switching devices connected with both ends of said reactor;
a D.C. power source, connected in series with an input reactor, for supplying an electric power to said resonant circuit through said pair of switching devices;
a transformer having said reactor in said resonant circuit as a primary winding;
a self-excited oscillation circuit connected with a tertiary winding, for alternately switching said pair of switching devices;
a rectifying circuit for rectifying the outputs from a second winding of said transformer;
a smoothing circuit for smoothing the outputs from said rectifying circuit;
a pair of short-circuit prevention switches connected between both ends of said secondary winding and both input terminals of said rectifying circuit, respectively, which are alternately switched; and
an oscillation stopping circuit for stopping the oscillation operation in said self-excited oscillation circuit unit the controlling voltage of alternately switching said pair of switching devices in said self-excited oscillation circuit reaches the voltage sufficient to turn on said pair of switching devices.

8. A resonant converter according to claim 7, further comprising:
current direction detecting means, connected with said input reactor, for detecting the direction of the current flowing through said input reactor; and
oscillation stopping means for turning off said pair of switching devices in accordance with an output from said current direction detecting means when the current flowing through said reactor flows in the direction of returning an electric power to said D.C. power source, thereby stopping the oscillation operation.

9. A resonant power source for supplying electric power to a load circuit comprising:
a resonant circuit having a resonance reactor and a resonance capacitor;
a D.C. input power source connected with said resonant circuit;
a main switching device for switching the current to be supplied to said resonance reactor;
a diode connected in anti-parallel with said main switching device;
current direction detection means for detecting the direction of the current flowing through said resonance reactor; and
oscillation stopping means for turning off said main switching device in accordance with an oscillation stopping command from outside when the current flowing through said reactor flows in the direction of returning electric energy to said D.C. power source, thereby stopping the oscillation operation.

10. A resonant power source according to claim 9, wherein said resonance capacitor is connected in parallel with said load circuit.

11. A resonant power source according to claim 9, wherein said load circuit is constituted by a primary winding of a main transformer, connected with said resonant circuit, and rectifying and smoothing circuits connected with a secondary winding of the main transformer.

12. A resonant power source according to claim 11, wherein said load circuit comprises secondary winding side control means for controlling an output from the secondary winding.

13. A resonant power source according to claim 12, wherein said secondary winding side control means is constituted by a magnetic amplifier.

14. A resonant power source according to claim 12, wherein said secondary winding side control means serves to reduce or stop the electric power supply to an output terminal by said oscillation stopping command.

15. A resonant power source according to claim 12, wherein said secondary winding side control means is constituted by a pulse width modulation circuit using semiconductor switches.

16. A resonant power source according to claim 11, wherein said main transformer is provided with a tertiary winding an output signal from which is used to operate said main switching device thereby to perform a. self-excited oscillation.

17. A resonant power source according to claim 9, wherein said oscillation stopping means comprises:
means- for generating an oscillation stopping signal by a logical product of an oscillation stop command and a signal indicating that the current flowing through said resonance reactor flows in the direction of returning electric energy to said D.C. input power source, and
additional switching means which are switched in response to said oscillation stopping signal.

18. A resonant power source according to claim 9, wherein one end of a series circuit of said D.C. input power source and said resonance reactor is connected with a central point of a primary winding of a main transformer, a pair of main switching devices are connected between the other end of said series circuit and both ends of the primary winding, said pair of main switching devices being alternately switched with a phase difference of 180° from each other, and said resonance capacitor is connected between both ends of said primary winding.

19. A resonant power source according to claim 9, wherein said load circuit comprises the primary winding of the main transformer connected with said resonant circuit and a plurality of secondary winding of the main transformer.

20. A resonant power source comprising a D.C. input power source, a transformer, a main switching device, and a resonant circuit wherein a primary winding side circuit of said transformer is connected with said D.C. input power source through said switching device and said resonant circuit so that the waveform of the voltage or current supplied to the main switching device is a sine wave at a frequency of $f_1$, and an electric power is supplied to a load connected with the secondary winding of the transformer, further comprising:

current direction detection means for detecting the direction of the current flowing said resonant circuit;

oscillation stopping means for turning off said main switching device when said current flows in the direction of returning the electric power to said D.C. input power source, thereby stopping an oscillation operation; and output control means for controlling the operation of said oscillation stopping means at a frequency $f_2$ lower than the frequency $f_1$ in which the frequency $f_2$ is varied to control the output.

* * * * *